United States Patent

[11] 3,591,117

| [72] | Inventor | Emilio Lorenzo Mazzetti<br>Torino, Italy |
|---|---|---|
| [21] | Appl. No. | 860,185 |
| [22] | Filed | Sept. 23, 1969 |
| [45] | Patented | July 6, 1971 |
| [73] | Assignee | Ghisalba s.p.a.<br>Turin, Italy |
| [32] | Priority | Dec. 17, 1968 |
| [33] | | Italy |
| [31] | | 54322 A/68 |

[54] CLAMP FOR MOUNTING EQUIPMENT ON APERTURED SUPPORT PLATES
5 Claims, 8 Drawing Figs.

[52] U.S. Cl. .................................................... 248/224,
248/226
[51] Int. Cl. ..................................................... A47j 5/00,
A47b 97/00
[50] Field of Search .......................................... 248/203,
216, 217, 218, 220.5, 223, 224, 225; 151/41.75,
41.76

[56] References Cited
UNITED STATES PATENTS
3,217,772 11/1965 Adams ............................ 151/41.75
FOREIGN PATENTS
1,403,611 5/1965 France ............................ 151/41.75

*Primary Examiner*—Willaim H. Schultz
*Attorney*—Young and Thompson

ABSTRACT: A clamp adapted for connecting the fixing members of a device to an apertured support plate, this clamp comprising a coupling stirrup with feet engageable in the apertures of the support plate, and a connecting plate inserted with limited mobility within the coupling stirrup and provided with a threaded hole for the connection of a fixing member of the device to be supported, which passes through an elongated aperture of the coupling stirrup, thus allowing the supported device to be movable within certain limits on the support plate, so that all the fixing members thereof may be connected to the support plate by means of a corresponding plurality of clamps, even when the distances among the fixing members are different from the distances among the apertures of the support plate.

PATENTED JUL 6 1971 3,591,117
Fig. 1
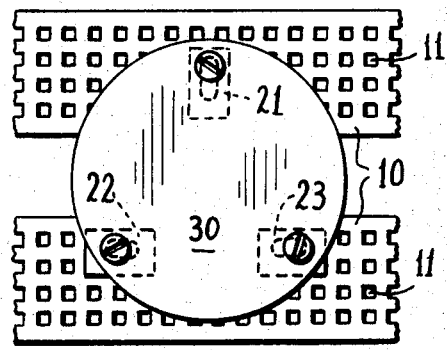
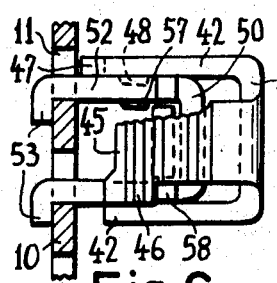
Fig. 6
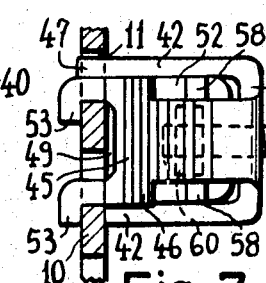
Fig. 7
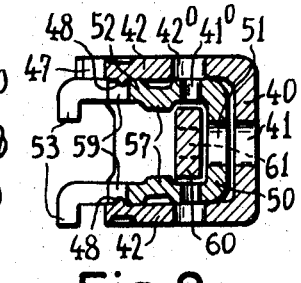
Fig. 8
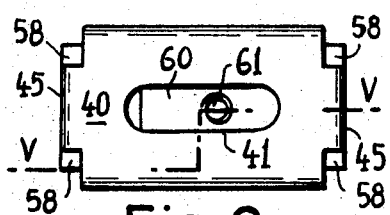
Fig. 2
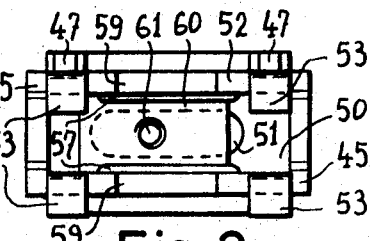
Fig. 3
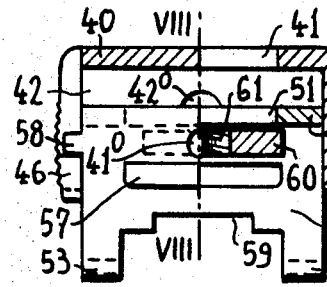
Fig. 5
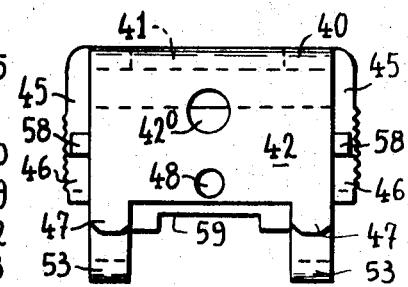
Fig. 4
INVENTOR
EMILIO LORENZO MAZZETTI
BY Young + Thompson
ATTORNEYS

CLAMP FOR MOUNTING EQUIPMENT ON APERTURED SUPPORT PLATES

This invention relates to a clamp for mounting equipment on apertured support plates, especially for the assembly of electrical equipment.

A frequently occurring technical problem in assembling equipment by applying devices on prearranged support plates, generally of the form of plates perforated or apertured regularly according to a fixed pattern, is, in fact, that devices of various origins frequently have anchorage apertures which are spaced irregularly or following different modules from those of the support plate, so necessitating the use of intermediate adapter elements. Furthermore, an important requirement which often arises is that of being able to assemble and possibly disassemble without access to the rear part of the support plate, i.e., by always operating from the front side of the equipment only.

The present invention is a clamp for mounting a device on an apertured support plate, comprising a coupling stirrup with feet adapted to engage in holes in a plate, and a plate having a threaded aperture inserted with limited mobility within said stirrup and accessible to a fixing member through an aperture in the stirrup in such manner that the mounting position provided by the fixing member may be moved within specific limits relative to the holes in the support plate.

An embodiment of the present invention will now be described by way of example, with reference to the accompanying drawings, wherein:

FIG. 1 shows on a small scale a section of an apertured plate (formed of apertured strips) carrying three clamps for the fixation of a device, according to the invention;

FIGS. 2, 3 and 4 show a clamp, on an enlarged scale, as seen from the front face, the rear face and a side face respectively;

FIG. 5 is a view similar to FIG. 4 but sectional along the cranked line V–V in FIG. 2;

FIGS. 6 and 7 are views of the clamp from the end face, the clamp being engaged in the apertures in a support plate, in the free and the fully engaged positions respectively; and FIG. 8 is a section on the line VIII–VIII in FIG. 5.

The plate 10 shown in FIG. 1 is of the type comprising separate strips, possibly spaced apart, with a regular network of square holes 11 for attachment of the clamps. In this example, three clamps represented generally as 21, 22, 23 are affixed to the plate 10 with two in the horizontal direction and one in the vertical direction, the fixing flange 30 of a device being attached to the clamps by three screws. The arrangement of the clamps makes such fixation possible in spite of the distances between the holes in the device not corresponding to the modular spacing of the holes in the plate.

Each clamp (FIGS. 2 to 8) has a coupling stirrup 50 provided with an elongated slot 51 which defines the mobility of the fixing hole: the side parts 52 of the stirrup 50 end in feet 53 adapted to engage the holes 11 in plate 10. Within the coupling stirrup 50 is a plate 60 with a threaded hole 61 for the fixing screws 90 (FIG. 7) of the device. The dimensions of plate 60 are such as to give it a mobility in the longitudinal direction within stirrup 50 corresponding approximately to that given to screw 90 by the slot 51 through which it passes, and at least equal in either direction from the central position to half the pitch of the apertures in plate 10.

The plate 60 is held in position and allowed the required mobility by longitudinal projections 57 formed in the side parts 52 of the coupling stirrup 50.

The clamp also includes a bit stirrup 40 provided with an elongated slot 41 corresponding to the slot 51 in coupling stirrup 50, for the passage of screw 90. The side parts 42 of stirrup 40 extend near the feet 53 of the coupling stirrup 50, which is housed within the bit stirrup 40 as to be somewhat movable in the sense of approaching or withdrawing feet 53 from the edges of the side parts 42. The longitudinal position of the coupling stirrup 50 in the bit stirrup 40 is defined by end members 45 on the latter, folded up to close the bit stirrup 40 in box manner, and having shoulders 46 which on cooperating with the wings 58 of the coupling stirrup 50 limit the mobility of the latter so that it cannot be separated.

The bit stirrup 40 also has a pair of latches 47 adjacent two of the feet 53 on the outside thereof, and adapted to enter the holes 11 in the plate 10 wherein the feet 53 are already engaged.

The use and operation of the clamps are as follows: With the device 30 laid on plate 10 in the selected position, the plate is marked with the positions of the fixing holes of the device, and then a clamp in accordance with the invention is engaged in the holes 11 which surround the marked position, so that this can be reached from the threaded hole 61 in plate 60 because of the mobility thereof. When engaged in the position and manner of FIG. 6, the clamp may obviously be removed by lifting it slightly and extracting it from the holes 11.

The device 30 is then applied to the engaged clamps, and the screws 90 having been passed through the holes in the flange 30 of the device are screwed into the holes 61 in the plates 60, which because of their mobility can be precisely aligned with the holes in flange 30. As soon as screws 90 are moving in, the bit stirrup 40, on which the flange 30 of the device presses, approaches the plate 10, so that the latches 47 enter the holes 11 adjacent feet 53, which thenceforward can no longer be removed from the holes.

With the screws 90 thus moved in but not yet tightened the position of the device 30 may be finally adjusted, and then the screws 90 are tightened. With this the bit stirrup 40 is pressed by flange 30 against the plate 10, while the feet 53 of the coupling stirrup 50 are pulled by the reaction of the plate 60 wherein screws 90 are engaged. The plate 10 is thus gripped between the parts 42 and 53, locking the clamp relative to the plate and eliminating the previously existing play.

It is clear that the same operations performed in reverse order will enable the clamp to be removed from the support plate. It should be noted, however, that this is only possible after considerable unscrewing of screws 90 and withdrawing the bit stirrup 40 from plate 10 by disengaging the latches 47. Thus a mere accidental shift of the fixing screws would not permit disengagement of the clamp, which would be held in place (though with some play) by the latches 47. This is an important safety feature in the clamp provided by the invention.

With the aim of stabilizing the free and the locked positions of the clamp, independently of tightening screw 90, also if the device is disassembled, the side parts 42 of stirrup 40 are formed with punched portions 48 whose internal shape can engage in recesses in the longitudinal punched portions 57 in the coupling stirrup 50 (FIG. 6), or in recesses 59 in the edges of the side parts 52 of the same stirrup (FIG. 8), thus stabilizing the two operating positions of the clamp and preventing the clamp passing accidentally from one to the other.

When the clamp is in a position as in FIG. 6, it can be freely engaged and disengaged from the apertured plate. Once the most suitable position has been selected, it is sufficient to press on the bit stirrup 40 to change to the position as in FIG. 7, wherein the latches 47 have entered above feet 53 in the holes 11, preventing subsequent disengagement of the clamp. Tightening of screw 90 will then produce a positive pressure gripping the edges of holes 11 between the feet 53 and the edges of the walls 42 in stirrup 40. In order to return to the free position in FIG. 6, after removal of screw 90 it is sufficient to apply a pull to stirrup 40, and for this purpose the end portions 45 thereof are preferably indented or knurled. The end parts 45 preferably have a recess 49 wherein may be inserted the end of a screwdriver or like tool wherewith the clamp may be lifted and freed from the locked position when this would necessitate excessive force for manual operation.

The sidewalls 42 and 52 of the stirrups 40 and 50 may advantageously be provided with apertures 42° and 52°, in positions such that they correspond when the clamp is in locked position and permit access to plate 60 disposed within coupling stirrup 50, for the purpose of sealing this in a selected position when this is desirable by means of a drop of varnish or like hardenable material.

It is obvious that the arrangement of the parts comprising the clamp, together with the actual shape of the various components and of the whole, may differ from those described and illustrated by way of example, without thereby departing from the scope of the invention and of the present patent.

Having thus described my invention, what I claim is:

1. A clamp for connecting the fixing members of a device to a support plate having apertures, comprising a coupling stirrup having feet capable of engaging in said apertures, a connecting plate having a threaded hole, said connecting plate being inserted with limited mobility within said coupling stirrup and said coupling stirrup having an elongated aperture facing said threaded hole, a bit stirrup enclosing said coupling stirrup, said bit stirrup having sidewalls projecting close to said feet of the coupling stirrup, and said bit stirrup further having an elongated aperture corresponding to said elongated aperture of the coupling stirrup, whereby both the elongated apertures of the coupling stirrup and bit stirrup may be traversed by a fixing member of the supported device engaged in said threaded hole, the feet of said coupling stirrup may engage said apertures of the support plate, and tightening of said fixing member produces gripping of said support plate between the feet of the coupling stirrup and the sidewalls of the bit stirrup.

2. A clamp as set forth in claim 1, wherein said bit stirrup has latches adapted to engage the apertures of the support plate wherein said feet of the coupling stirrup are engaged, thus positively preventing withdrawal of said feet.

3. A clamp as set forth in claim 1, wherein said coupling stirrup and bit stirrup have cooperating resilient detent means for stabilizing two positions of said coupling stirrup within said bit stirrup.

4. A clamp as set forth in claim 1, wherein said sidewalls of the bit stirrup have a punched portion, and said coupling stirrup has punched portions and recesses capable of engaging, respectively the ones or the others, with said punched portion of the bit stirrup.

5. A clamp as set forth in claim 1, wherein the sidewalls of both the coupling stirrup and bit stirrup have apertures facing the one another in the locking position of the clamp, for enabling the clamp to be sealed in locked position by means of a drop of varnish.